US011025992B2

(12) United States Patent
Strober

(10) Patent No.: US 11,025,992 B2
(45) Date of Patent: Jun. 1, 2021

(54) VALIDATING PARAMETERS ON DISCRETE COMPUTING APPLICATIONS TO GRANT ACCESS CONTROL TO CONTENT OR COMMANDS

(71) Applicant: Touchstream Technologies, Inc., New York, NY (US)

(72) Inventor: David Strober, Rye, NY (US)

(73) Assignee: TOUCHSTREAM TECHNOLOGIES, INC., Valhalla, NY (US)

( * ) Notice: Subject to any disclaimer, the term of this patent is extended or adjusted under 35 U.S.C. 154(b) by 21 days.

(21) Appl. No.: 15/511,903

(22) PCT Filed: Sep. 16, 2015

(86) PCT No.: PCT/US2015/050370
§ 371 (c)(1),
(2) Date: Mar. 16, 2017

(87) PCT Pub. No.: WO2016/044387
PCT Pub. Date: Mar. 24, 2016

(65) Prior Publication Data
US 2017/0251276 A1    Aug. 31, 2017

Related U.S. Application Data

(60) Provisional application No. 62/051,049, filed on Sep. 16, 2014.

(51) Int. Cl.
*H04N 21/6334* (2011.01)
*G06F 21/52* (2013.01)
(Continued)

(52) U.S. Cl.
CPC ....... *H04N 21/63345* (2013.01); *G06F 21/52* (2013.01); *H04L 63/083* (2013.01);
(Continued)

(58) Field of Classification Search
CPC .......... H04N 21/63345; H04N 21/234; H04N 21/25816; G06F 21/52; G06F 2221/2141;
(Continued)

(56) References Cited

U.S. PATENT DOCUMENTS 7,606,560 B2 * 10/2009 Labrou ............... H04W 12/069
455/411
8,316,237 B1 * 11/2012 Felsher ................ H04L 9/0825
380/282

(Continued)

FOREIGN PATENT DOCUMENTS

WO    2013/110669    8/2013

OTHER PUBLICATIONS

International Search Report and Written Opinion issued by ISA/AU for Patent Application No. PCT/US2015/050370 (dated Dec. 7, 2015).

*Primary Examiner* — Eleni A Shiferaw
*Assistant Examiner* — Bassam A Noaman
(74) *Attorney, Agent, or Firm* — Shook, Hardy & Bacon, L.L.P.

(57) ABSTRACT

A system for validating an authorization request to facilitate controlling access to content or computer commands, in which the access is requested by multiple entities operated on discrete computing environments. The techniques make use of a system including a switchboard and a rule engine that collect parameter sets required for validation from the entities and dynamically generate a lock and key combination based on the collected parameter sets. The key of the lock and key combination allows the system to validate each entity independently regardless of the required parameters specified in the lock and key combination.

24 Claims, 3 Drawing Sheets

(51) Int. Cl.
*H04L 29/06* (2006.01)
*H04N 21/234* (2011.01)
*H04N 21/258* (2011.01)

(52) U.S. Cl.
CPC ....... *H04L 63/0807* (2013.01); *H04N 21/234* (2013.01); *H04N 21/25816* (2013.01); *G06F 2221/2141* (2013.01); *G06F 2221/2147* (2013.01)

(58) Field of Classification Search
CPC ......... G06F 2221/2147; H04L 63/0807; H04L 63/083
See application file for complete search history.

(56) References Cited

U.S. PATENT DOCUMENTS

| | | | |
|---|---|---|---|
| 8,555,367 | B2 | 10/2013 | Syed et al. |
| 8,806,192 | B2 | 8/2014 | Bostanci et al. |
| 9,037,112 | B2 * | 5/2015 | Rajadurai ............. H04L 9/0822 380/270 |
| 9,306,754 | B2 * | 4/2016 | Baghdasaryan ...... H04L 9/3247 |
| 2012/0317624 | A1 | 12/2012 | Llorente et al. |

* cited by examiner

VALIDATING PARAMETERS ON DISCRETE COMPUTING APPLICATIONS TO GRANT ACCESS CONTROL TO CONTENT OR COMMANDS

CROSSED-REFERENCE TO RELATED APPLICATION(S)

The present application is claims the benefit of priority of U.S. Provisional Patent Application No. 62/051,049, filed on Sep. 16, 2014.

BACKGROUND

This disclosure relates to controlling access to content or computer commands. Such access can be requested by multiple users, devices, and/or data sources connected via a computer network such as the Internet.

Computing is becoming more ubiquitous. Recently, various types of electronic devices have been built to have the ability to collect, store, share, and act on data from one or more connected networks. For example, a washing machine can be programmed to sense how often it is being used or how well its component parts are functioning, and to send out a service request when the washing machine is in need of maintenance. In another example, an individual may want to watch a video that she found using her mobile phone from a content provider's server. The individual may use the mobile phone to send a request for validating that she paid the cable operator's server for the video and play that video on her connected TV or share that video with a friend's mobile phone after the request is validated.

A request sent by an entity (e.g., a mobile phone or a TV) to ask for permission to access content or to respond to commands initiated by other entity needs to be validated based on a proper combination of multiple parameters obtained from the entities. A challenge arises when the entities involved do not have access to, direct connections to, or knowledge of other entities. In other words, the entities are operated on discrete computing environments and, therefore, the parameters required for validation can only be retrieved from the multiple discrete environments. It is even more challenging to validate a request when the parameters are based on dynamic data sets that can be changed at any time, as the parameters need to be verified at frequent time intervals.

SUMMARY

The present disclosure describes techniques to facilitate controlling access to content or computer commands, in which the access is requested by multiple entities operated on discrete computing environments. The techniques make use of a system including a switchboard and a rule engine that collect parameter sets required for validation from the entities and dynamically generate a lock and key combination based on the collected parameter sets. The key of the lock and key combination allows the system to validate each entity independently regardless of the required parameters specified in the lock and key combination.

In one aspect, for example, a machine-implemented method of validating an authorization request for executing a command includes receiving, at a server system, an authorization request from a first entity for authorizing a second entity to execute a command initiated by the first entity, in which the authorization request specifies a service provider required for the command to be executed. The server system is operable to request parameters from the first entity, the second entity, and the service provider, in which the parameters are required for validating the authorization request. The method includes receiving, at the server system, the required parameters from the first entity, the second entity, and the service provider. The server system is operable to generate a lock and key combination based on the received parameters, in which the lock and key combination includes a lock and a key that match each other. The sever system is operable to send the key to the first entity, the second entity, and the service provider. The method includes receiving, at the server system, the key from the service provider, in which the key is sent from the service provider in response to the service provider receiving a request from the second entity. The server system is operable to determine whether the key received from the service provider matches the lock of the lock and key combination, and in response to a determination that the second determination that the key matches the lock, the server system is operable to authorize the second entity and the service provider to execute the command initiated by the first entity.

In another aspect, for example, a machine-implemented method of validating an authorization request for accessing content includes receiving, at a server system, an authorization request from a first entity for authorizing a second entity to play content specified by the first entity, in which the content is stored at a content server. The server system is operable to request parameters from the first entity, the second entity, and the content server, in which the parameters are required for validating the authorization request. The method includes receiving, at the server system, the required parameters from the first entity, the second entity, and the content server. The server system is operable to generate a lock and key combination based on the received parameters, in which the lock and key combination includes a lock and a key that match each other. The server system is operable to send the key to the first entity, the second entity, and the content server. The method includes receiving, at the server system, the key from the content server, in which the key is sent to the content server by the second entity in response to the content server receiving a request from the second entity. The server system is operable to determine whether the received key matches the lock of the lock and key combination, and in response to a determination that the received key matches the lock, the server system is operable to authorize the second entity to load the content from the content server and play the content.

In yet another aspect, for example, a machine-implemented method of validating an authorization request for executing a command including receiving, at a server system, an authorization request from a first entity for authorizing a second entity to execute a command initiated by the first entity, in which the authorization request specifies a third entity required for the command to be executed. The server system is operable to request parameters from the first, second, and third entities, in which the parameters are required for validating the authorization request. The method includes receiving, at the server system, the required parameters from the first, second, and third entities. The server system is operable to generate a lock and key combination based on the received parameters, in which the lock and key combination includes a lock and a key that match each other. The server system is operable to send the key to the first entity and second entity. The method includes receiving, at the server system, the key from the third entity, in which the key is sent to the service provider by the second entity. The server system is operable to determine whether the key received from the third entity matches the lock of the lock and key combination, and in response to a determination that the key received from the third entity matches the lock, authorizing the second entity and the third entity to execute the command initiated by the first entity.

Systems for validating an authorization request are described as well. For example, in some implementations, a system includes a network, a first device coupled to the network, a second device coupled to the network, and a server system coupled to the network and including one or more servers. The server system is operable to, in response to receiving an authorization request from the first device for authorizing a second device to execute a command initiated by the first device, in which the authorization request specifies a service provider required for the command to be executed, to request parameters from the first device, the second device, and the service provider, in which the parameters are required for validating the authorization request. In response to receiving the required parameters from the first device, the second device, and the service provider, the server system is operable to generate a lock and key combination based on the required parameters, in which the lock and key combination includes a lock and a key that match each other. The server system is operable to send the key to the first device, the second device, and the service provider. The server system is operable, in response to receiving the key from the service provider, to determine whether the key matches the lock of the lock and key combination, in which the key is sent from the service provider in response to the service provider receiving a request from the second device. In response to a determination that the key received from the service provider matches the lock, the server system is operable to authorize the second device and the service provider to execute the command initiated by the first device.

Various implementations include one or more of the following advantages. For example, the techniques described here can be used even if the entities involved in an authorization request do not have access to, knowledge of, or direct connections to each other. In addition, the techniques can facilitate dynamically validating a request even if parameters required for the validation are based on dynamic data sets that can be changed at any time. Furthermore, the techniques can facilitate centralized controlling of content or commands for multiple devices or machines (e.g., controlling the displays of television sets located in multiple guest rooms in a hotel, or controlling switches of multiple light poles located at different streets).

Other aspects, features and advantages will be apparent from the following detailed description, the accompanying drawings, and the claims.

DETAILED DESCRIPTION

Figure 1:
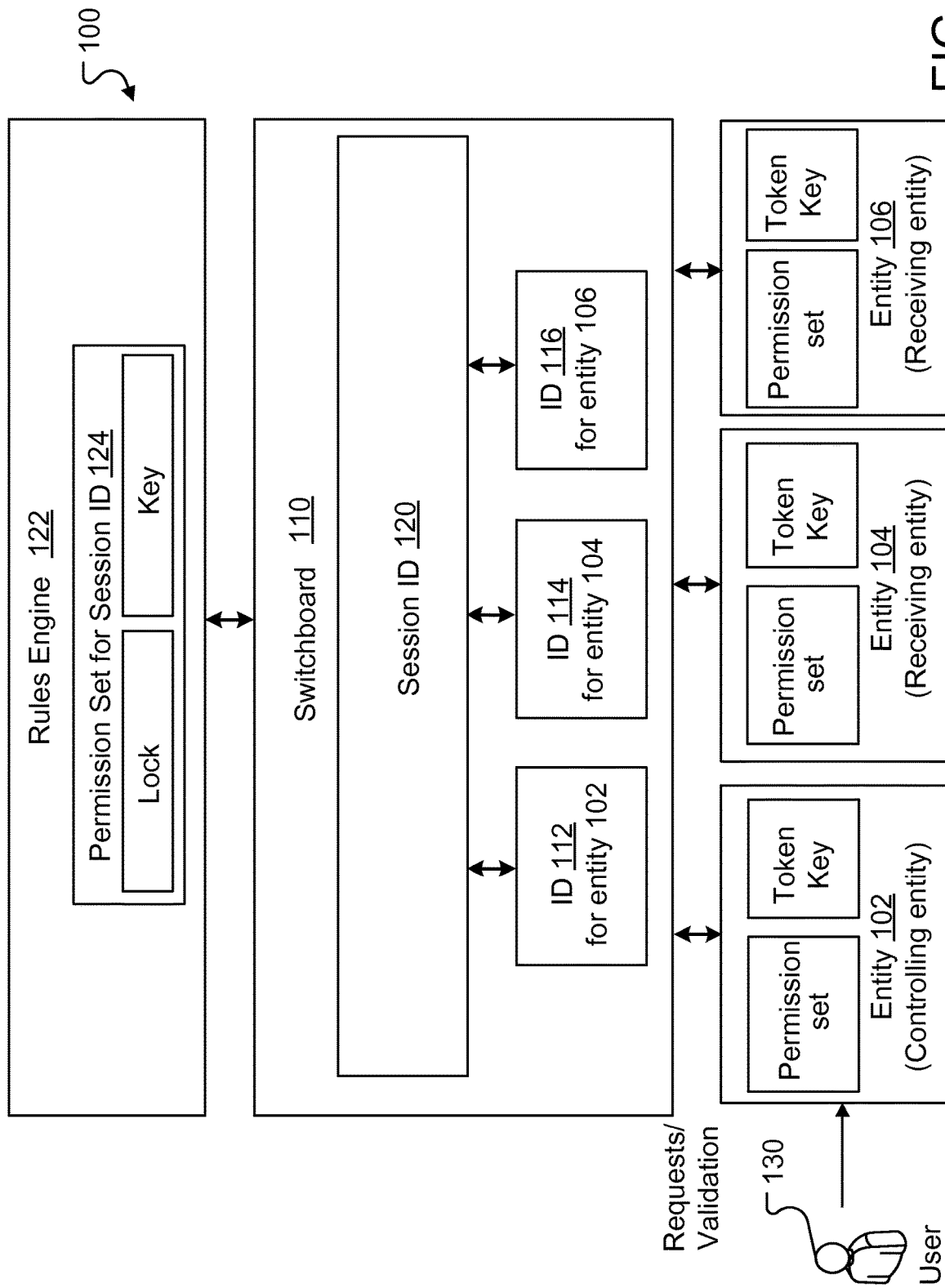
FIG. 1 is a block diagram illustrating an example of a system according to the invention.

As shown in FIG. 1, a system 100 facilitates synchronizing a connection between multiple entities (e.g., entities 102, 104 and 106), a switchboard 110, and a rules engine 122 connected to the Internet or other computer network. The connection is designed to be made by a first entity 102 that acts as a controlling entity and one or more other entities (e.g., entities 104 and 106) each acting as a receiving entity to access content selected by the first entity 102 and/or to respond to commands that originate at the first entity 102. For example, the first entity 102 can be a personal computing device such as a mobile phone that includes a display, an internal microprocessor or other processing circuitry, a keypad, keyboard, touchscreen, mouse, trackball, or other device to receive user selections and other input, and a transceiver to establish communications to the Internet. More generally, the first entity 102 can be any type of handheld or other Internet-enabled personal computing device, including personal computers, e-books, kiosks, tablets, smart phones and media players. Alternative, or additionally, the first entity 102 can be artificial intelligent software or any other computer program or application running on a computing device. In some cases, the first entity 102 can receive input from a user in forms other than tactile input (e.g., acoustic or speech).

A receiving entity (e.g., entity 104 or 106) can be any type of Internet-enabled electrical/electronic device, machine, or appliance. For example, a receiving entity can be a personal computing device (e.g. a mobile phone, a tablet computer, personal computer, or laptop computer), a gaming console, or a television set. In some cases, a receiving entity can be a service provider such as a web content provider, a web service, an application, or a payment system. As an example, a user may want to operate a television set and/or other display remotely from a personal computing device, such as a mobile phone. In this example, the mobile phone is a controlling entity and the television set or other display is a receiving entity. In another example, a user may want to purchase a soft drink from a vending machine. The user uses his mobile phone to make a payment to a payment system and receives a soft drink from the vending machine. In this case, the mobile phone is a controlling entity while the vending machine and the payment system are receiving entities. In yet another example, a user may want to use a mobile phone to control switches of multiple light poles. In this case, the mobile phone acts as a controlling entity and the light poles act as receiving entities. Although FIG. 1 shows two receiving entities (e.g., entity 104 and 106), there may be other numbers of receiving entities. Furthermore, the receiving entities may be of different types. The controlling entity and the receiving entities can be operated at multiple discrete computing environments. Thus, each entity does not necessarily have access to, knowledge of, or direct connections to one or more of the other entities. Therefore, there is a need of a centralized system or device that can communicate with each entity and coordinate activities among the entities. Such system or device can be, for example, a switchboard as described further below.

As shown in FIG. 1, the controlling entity 102 is operable to receive an request from a user 130 to control a receiving entity and/or to cause a response by another receiving entity to commands initiated by the entity 102. For example, the user 130 may want to use a mobile phone (e.g., entity 102) to control the display of content on a TV (e.g., entity 104). The content can be, for example, a video provided by a service provider such as a content server (e.g., entity 106). More generally, depending on the implementation, the content may include one or more of the following: audio, text, interactive video game, streaming media, multimedia, images, slides, or other types of dynamic content. Each of the controlling and receiving entities may have a set of permission parameters associated with itself, which is used by each entity to obtain permission to access content or respond to commands. In some cases, these parameters may be directly associated with the entities. For example, a permission parameter associated with an entity may specify that the entity can only make a request if the request comes from a particular geo-graphic region. In other cases, these parameters may be stored in a server in which the entity resides, or the parameters may be referenced to another source (e.g., an entity cannot make a request for content that is sensitive or unsecured, or content that exceeds a certain size), or the parameters may be based on a logical function that needs to be executed independently.

After the controlling entity 102 receives the request from the user 130, the request is sent to a switchboard 110 through the Internet (or other computer network). The switchboard 110, which may be implemented, for example, as a server system or as part of a server system that includes one or more servers, is coupled to the Internet and serves as a coordinator among the entities involved. The switchboard 110 is operable to interact with a rule engine 122 through the Internet (or other computer network) to receive instructions to validate the controlling entity 102 and other entities involved in the request. The rule engine 122 may reside at the same server system as the switchboard or at a different server system. The server system may be located at an organization or distributed across the Internet or other computer network.

Figure 2:
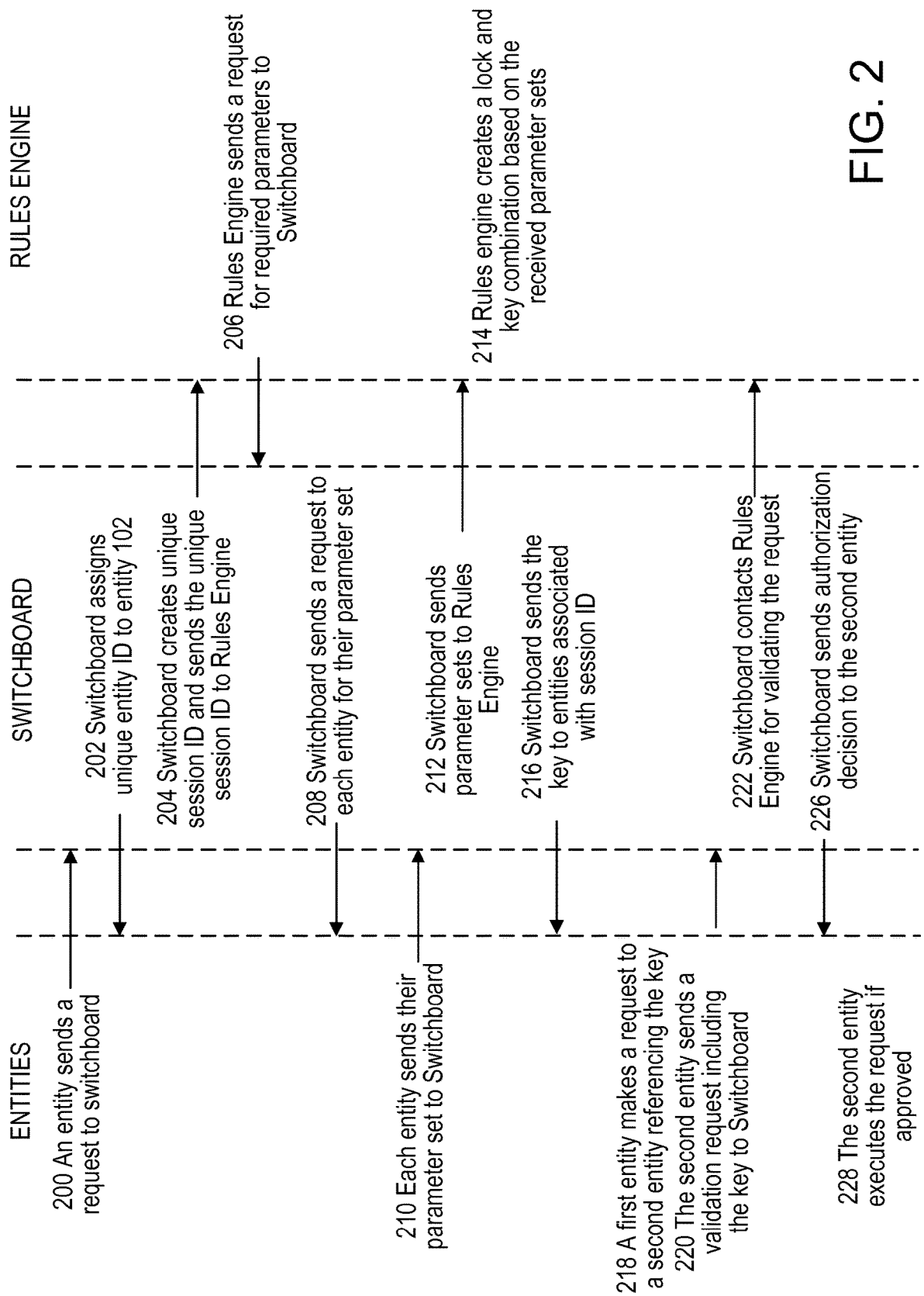
FIG. 2 illustrates a method for validating parameters on discrete computing environments to grant access control to content or computer commands.

The following paragraphs describe in detail an example of how a connection can be established between the entities, the switchboard, and the rules engine, and how the switchboard and rules engine validate the entities to grant access control to content or commands. Various details are illustrated in FIGS. 1 and 2. As indicated by FIG. 2, when the controlling entity 102 initially send a request from the user 130 to the switchboard 110 (see 200 in FIG. 2), the switchboard 110 generates a unique entity ID for each entity involved in the request and assigns the unique entity ID to each entity (see 202 of FIG. 2). For example, as shown in FIG. 1, the switchboard assigns ID 112 to entity 102, ID 114 to entity 104, and ID 116 to entity 106. Subsequently, the switchboard 110 creates a unique session ID 120 to associate with the request (see 204 of FIG. 2 and FIG. 1). The unique session ID specifies entities involved in the request. The unique session ID 120 then is transmitted to the rules engine 122. Upon receiving the unique session ID 120, the rules engine 122 transmits a request for parameters that are required for validation of the entities to the switchboard 110 (see 206 of FIG. 2). The switchboard 110 sends the request to each entity and asks each entity to respond with a parameter set associated with that entity (see 208 of FIG. 2). In response to the request from the switchboard 110, each entity sends its parameter set to the switchboard 110 (see 210 of FIG. 2). If there is a new entity in addition to the entities included in the initial request sent by the controlling entity 102, the switchboard 110 generates a new unique entity ID, assigns the new ID to the new entity, and repeats the process of acquiring a parameter set associated with the new entity. The switchboard 110 then sends the parameter sets received from all of the entities to the rules engine 122 (see 212 of FIG. 2). The rules engine 122 determines if additional parameter sets are required. If additional parameter sets are required, the rules engine 122 sends another request to the switchboard 110 for the additional parameter sets. The switchboard 110 then retrieves the additional parameter sets from one or more of the entities involved in the initial request and sends the additional parameter sets to the rules engine 122. In some cases, the rules engine 122 requires additional parameters from an additional entity beyond the entities involved in the initial request. In these cases, the switchboard 110 adds the additional entity to the group of entities involved in the initial request and retrieves additional parameters from the additional entity. The additional entity is added to the unique session ID associated with the initial request.

After receiving and collecting all of the parameter sets from the various entities, the rules engine generate a permission set 124 for the unique session ID 120 (see FIG. 1) based on the collected parameter sets. The rules engine 122 then generates a lock and key combination for the unique session ID based on the permission set (see 214 of FIG. 2). Each lock and key combination may be only associated with one unique session ID. A process of generating a lock and key combination and validating the entities based on the key of the lock and key combination is explained in greater detail below in the description associated with FIG. 3. Subsequently, the switchboard 110 transmits the key of the lock and key combination to each of the entities associated with the session ID 120 for using in their requests (see 216 of FIG. 2). The rules engine 122 can determine which entities (e.g., computing devices, applications, or service providers) need to be contacted to validate parameters associated with the lock and key combination. The rules engine can send a request for validation to each of the identified entities either synchronously or asynchronously using the switchboard 110. When one of the entities makes a request to another entity (e.g., a TV makes a request to a content server for loading a video), it includes a reference to the key provided by the switchboard 110 in the request (see 218 of FIG. 2). For example, the reference may be a session ID. The request made by the one of the entities may identify one or more other entities that are required to complete the request. For the sake of simplicity, in the following discussion, it is assumed that the request is made by a first receiving entity (e.g., the TV) and is directed to a second receiving entity (e.g., the content server). The second receiving entity, to which the request is directed, retrieves a key based on the reference (e.g., a session ID) included in the request. The second receiving entity then sends to the switchboard 110 a validation request that includes the key (see 220 of FIG. 2). The switchboard 110 contacts the rules engine 122 for validating the validation request made by the second receiving entity. The rules engine 122 compares the key received from the second receiving entity with the lock in the lock and key combination. If there is a match, the rules engine 122 sends a message to the switchboard 110 approving the request. If the key does not match with the lock in the lock and key combination, the rules engine 122 sends a message to the switchboard 110 denying the request. The switchboard 110 then sends a final authorization decision to the first entity and the second entity that fulfills the request. If the request is approved, the second receiving entity executes the request (see 228 of FIG. 2). For example, the content server allows the TV to load the video from the server and play the video.

Figure 3:
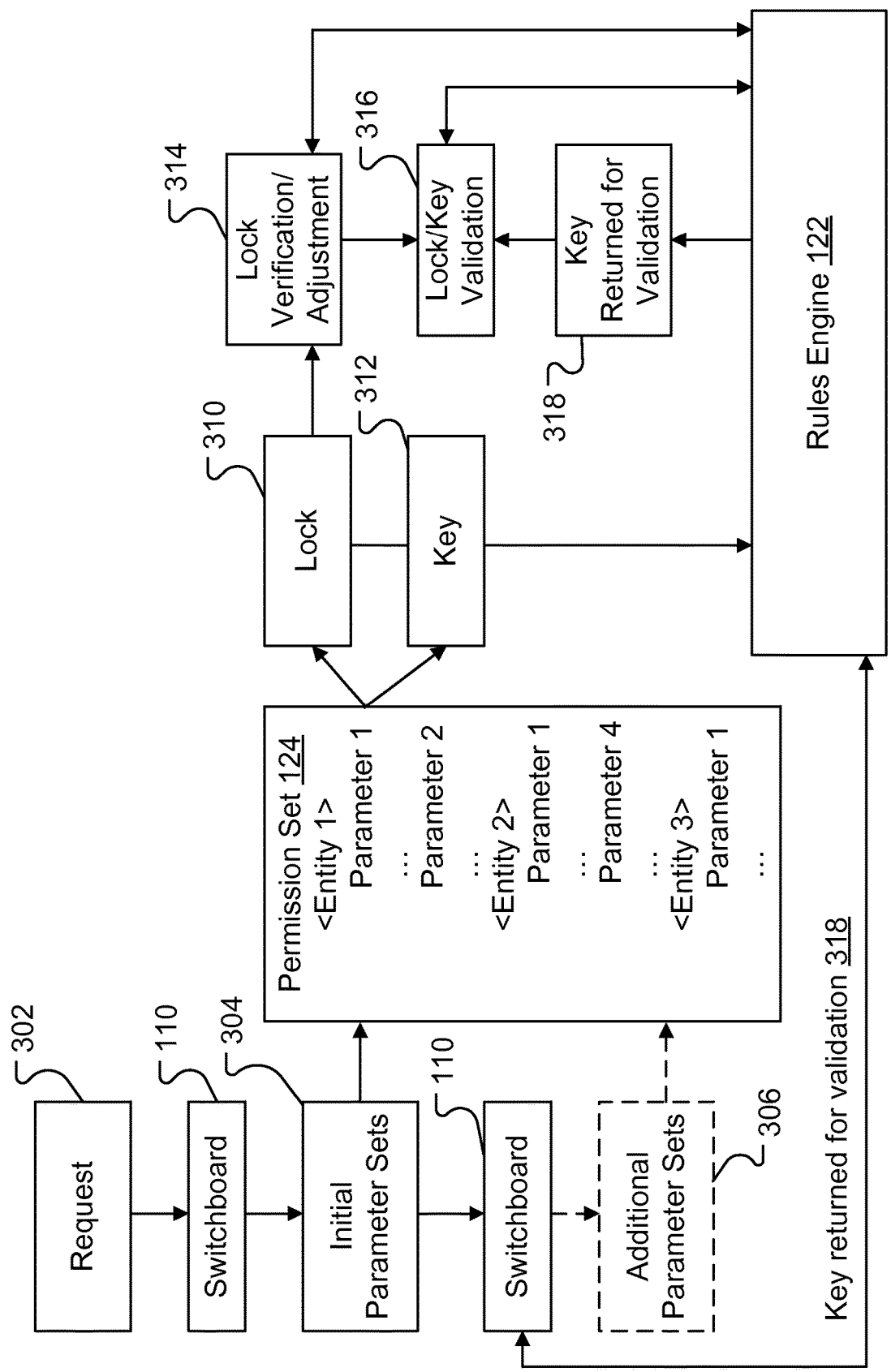
FIG. 3 illustrates an example for generating a lock and key combination and validating a request based on the key of the lock and key combination.

FIG. 3 illustrates further detailed operations of the rules engine 122 according to some implementations, for example, how the rules engine 122 creates the permission set 124 and generates a lock and key combination. As shown in FIG. 3, a first entity (e.g. a controlling entity) sends a request 302 that specifies one or more receiving entities involved in the request 302 to the switchboard 110. The switchboard 110 contacts the rules engine 122 and receives a request from the rules engine 122 to retrieve an initial parameter sets 304 from the entities involved in the request 302. The switchboard 110 retrieves the initial parameter sets 304 from the entities and sends the initial parameter sets 304 to the rules engine 122. For example, a parameter set obtained from a first entity may specify that the first entity can only make a request if the request comes from a particular geo-graphic region. A parameter set obtained from a second entity may specify that the second entity cannot make a request for content that is sensitive or unsecured, or content that exceeds a certain size. The content may have a parameter set associated with the content and stored at a content server. Based on the received initial parameter sets, the rules engine 122 creates a permission set 124. Upon creating the permission set 124, the rules engine 122 may determine that other parameter sets may be required to complete the permission set. The rules engine 122 may then make a request to the switchboard 110 to acquire an additional parameter set(s) 306 from one or more of the entities. For instance, an additional parameter set associated with the requested content may specify one or more of the following: (i) that the first entity needs to be associated with a specific organization, (ii) that the second entity needs to be registered with a specific organization, or (iii) that the first and second entity needs to be in a certain proximity or on the same network.

After receiving the initial and additional parameter sets from the entities through the switchboard, the rules engine 122 completes creating the permission set 124. For example, in some instances, a permission set can comprise parameters from parameter sets obtained from the first entity, the second entity, and the content server as follows:

(1) Parameter set from the first entity requiring that the geo-graphic region associated with the first entity matches one of a predetermined set of geo-graphic regions.
(2) Parameter set from the second entity requiring that the content requested by the second entity has a security level less than a predetermined level, and the content requested by the second entity has a size less than a predetermined size.
(3) Parameter set from the content server requiring that the requested content references to the server, the user associated with the first entity belongs to a predetermined group of user, the first entity belongs to a predetermined group of entities, and the first entity and second entity are both on the same local network.

The permission set 124 may take a form of a computer file, for example, an Extensible Markup Language (XML) file format. The permission set 124 may be stored at one or more databases.

The rules engine 122 then generates a lock and key combination based on the created permission set 124. The lock and key combination includes a lock 310 and a key 312. The lock 310 may include the parameters in the permission set 124 and multiple values, in which each value is associated with a parameter in the permission set 124. The key 312 may be generated to correspond to the lock 310 and the values associated with the parameters in the permission set 124. For example, the key 312 may be a duplicated copy of the lock 310 in an encrypted format. In another example, the key 312 may include the values included in the lock, in which the value is encrypted. In yet another example, the key 312 may be an encrypted reference to a session ID associated with the lock and key combination. The values associated with the parameters in the permission set 124 may be verified periodically by the rules engine. If one or more values changes, the rules engine 122 adjusts the lock 310 accordingly (see 314 of FIG. 3). The rules engine 122 retains the lock 310 and sends the key 312 to the entities involved in the request 302 through the switchboard 110.

When one of the entities makes a request to another entity, it includes a reference to the key 312 provided by the switchboard 110 in the request (see 218 of FIG. 2). For example, the second entity (e.g., a TV) makes a request to a content server for loading a video and includes a session ID as a reference in the request. The content server, to which the request is directed, retrieves the key 318 based on the session ID included in the request. In some cases, the entity, to which the request directed, may not have a key to retrieve. For example, the content server may not have received the key 312 from the switchboard 110. In these cases, the entity that makes the request may include the key itself in the request.

After having the key 318, the content server sends a validation request and the key 318 to the switchboard 110. The switchboard 110 validates the request by passing the key 318 to the rules engine 122. The rules engine 122 determines if the key 318 matches the lock 310 (see 316 of FIG. 3). If there is a match, the rules engine 122 sends a message to the switchboard 110 authorizing the request. The switchboard 110 sends the authorization to the entities involved (e.g., the second entity, the content server, and/or the first entity). After receiving the authorization, the second entity may access the content server to load the content and play the content. If the key 318 does not match the lock 310 (e.g., when the lock 310 has been adjusted), the rules engine 122 may send a message to the entities involved through the switchboard denying the request or send another possible response. For example, the rules engine 122 may request the content server to provide additional information for validation or send another key.

Implementations of the subject matter and the operations described in this specification can include digital electronic circuitry, or in computer software, firmware, or hardware, including the structures disclosed in this specification and their structural equivalents, or in combinations of one or more of them. Implementations of the subject matter described in this specification can include one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can include operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer include a processor for performing actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile, audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

Although this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described herein and the attachments hereto should not be understood as requiring such separation in all implementations, and it should be understood that the described program components and systems can generally be integrated together in a single software product or packaged into multiple software products.

Thus, although particular implementations have been described, other implementations are within the scope of the claims.

What is claimed is:

1. A machine-implemented method of validating an authorization request for executing a command, the method comprising:

receiving, at a server system, the authorization request from a first entity for authorizing a second entity to execute the command initiated by the first entity, wherein the first entity and the second entity are different computing devices, wherein the received authorization request specifies a service provider required for the command to be executed;

generating, by the server system, an access control session, wherein, based on the authorization request, the server system associates each of the first entity, the second entity and the service provider with one another during the access control session;

requesting, by the server system, a corresponding set of parameters from each of the first entity, the second entity, and the service provider, wherein each corresponding set of parameters is required for validating the received authorization request;

receiving, at the server system, the requested corresponding sets of parameters from the first entity, the second entity, and the service provider;

generating, by the server system, a matching lock and key combination for the access control session based on the received corresponding sets of parameters, wherein the generated matching lock and key combination is associated with and identified by a generated unique session ID, wherein the generated matching lock and key combination includes a lock and a key that match each other;

sending, by the server system, the key of the generated matching lock and key combination of the access control session to each of the first entity, the second entity, and the service provider;

receiving, at the server system, the key from the service provider, wherein the key is sent from the service provider in response to the service provider receiving a request from the second entity;

determining, by the server system, that the second entity and the service provider are included in the access control session based on whether the key received from the service provider matches the lock of the generated matching lock and key combination of the access control session; and in response to a determination that the second entity and the service provider are included in the access control session, authorizing the second entity and the service provider to execute the command initiated by the first entity.

2. The method of claim 1 wherein the first entity is a program running on the computing device.

3. The method of claim 1, wherein the first entity and the second entity are of different types.

4. The method of claim 1, wherein the first entity and the second entity are operated at discrete computing environments.

5. The method of claim 1 further including: the unique session ID is associated with the received authorization request and the access control session; and receiving, at the server system, the key from the service provider, wherein the key is retrieved by the service provider based on the unique session ID being included in the request that the service provider receives from the second entity.

6. The method of claim 1 further including: after receiving the requested corresponding sets of parameters from each of the first entity, the second entity, and the service provider, determining whether additional parameters are required for validating the received authorization request; in response to a determination that the additional parameters are required, requesting, by the server system, the additional parameters from at least one of the first entity, the second entity, and the service provider; receiving, at the server system, the additional parameters from the at least one of the first entity, the second entity, and the service provider, wherein the matching lock and key combination is generated based further on the received additional parameters.

7. The method of claim 1 further including: in response to a determination that the received key does not match the lock, sending a message to at least one of the first entity, the second entity, and the service provider denying the received authorization request.

8. A machine-implemented method of validating an authorization request for accessing content, the method comprising:
receiving, at a server system, the authorization request from a first entity for authorizing a second entity to play the content specified by the first entity, wherein the first entity and the second entity are different computing devices,
wherein the content is stored at a content server;
generating, by the server system, an access control session, wherein, based on the authorization request, the server system associates each of the first entity, the second entity and the content server with one another during the access control session;
requesting, by the server system, a corresponding set of parameters from each of the first entity, the second entity, and the content server, wherein the corresponding sets of parameters are required for validating the received authorization request;
receiving, at the server system, the requested corresponding sets of parameters from the first entity, the second entity, and the content server;
generating, by the server system, a matching lock and key combination for the access control session based on the received corresponding sets of parameters,
wherein the generated matching lock and key combination is associated with and identified by a generated unique session ID,
wherein the generated matching lock and key combination includes a lock and a key that match each other;

sending, by the server system, the key of the generated matching lock and key combination of the access control session to each of the first entity, the second entity, and the content server;
receiving, at the server system, the key from the content server,
wherein the key is sent by the content server in response to the content server receiving a request from the second entity;
determining, by the server system, that the second entity and the content server are included in the access control session based on whether the key received from the content server matches the lock of the generated matching lock and key combination of the access control session; and
in response to a determination that the second entity and the content server are included in the access control session, authorizing the second entity to load the content from the content server and play the content.

9. The method of claim 8 wherein the content comprises one of streaming media, visual content, or video.

10. The method of claim 8, wherein the corresponding set of parameters received from the first entity requires that the geo-graphic region associated with the first entity matches a region in a predetermined set of geo-graphic regions.

11. The method of claim 8, wherein the corresponding set of parameters received from the second entity requires at least one of the following: (i) that the content has a security level less than a predetermined level, or (ii) that the content has a size less than a predetermined size.

12. The method of claim 8, wherein the corresponding set of parameters received from the content server requires at least one of the following: (i) that the content references the content server, (ii) a user associated with the first entity belongs to a predetermined group of users, (iii) the first entity belongs to a predetermined group of entities, or (iv) the first entity and the second entity are both on a common local network.

13. A system comprising: a network; a first device coupled to the network; a second device coupled to the network, wherein the first device and the second device are different computing devices; and a server system coupled to the network and comprising one or more servers,
wherein responsive to receiving an authorization request from the first device to authorize the second device to execute a command initiated by the first device,
wherein the received authorization request specifies a service provider required for the command to be executed, the server system is operable to:
generate, by the server system, an access control session, wherein, based on the authorization request, the server system associates each of the first device, the second device and the service provider with one another during the access control session;
request a corresponding set of parameters from each of the first device, the second device, and the service provider,
wherein each requested corresponding set of parameters is required for validating the received authorization request;
generate, by the server system, a matching lock and key combination for the access control session based on the requested corresponding sets of parameters being received from the first device, the second device, and the service provider, wherein the generated matching lock and key combination is associated with and identified by a generated unique session ID, wherein the generated matching lock and key combination includes a lock and a key that match each other;

send, by the server system, the key of the generated matching lock and key combination of the access control session to each of the first device, the second device, and the service provider;

determine, by the server system, that the second device and the service provider are included in the access control session based on whether the key, received from the service provider in response to the service provider receiving a request from the second device, matches the lock of the generated matching lock and key combination of the access control session; and authorize the second device and the service provider to execute the command initiated by the first device in response to a determination that the second device and the service provider are included in the access control session.

14. The system of claim 13, wherein the first device is a personal computing device that includes a display.

15. The system of claim 13, wherein the first device is operable to receive input from a user, wherein the input is at least one of tactile input or speech.

16. The system of claim 13, wherein the server system is further operable to: determine whether additional parameters are required for validating the received authorization request; and request the additional parameters from at least one of the first device, the second device, and the service provider based on a determination that the additional parameters are required, wherein the matching lock and key combination is generated based further on the requested additional parameters received from the at least one of the first device, the second device, and the service provider.

17. The system of claim 13, wherein the second device is operable to execute the command initiated by the first device in response to receiving the authorization from the server system.

18. The system of claim 13, wherein the lock of the generated matching lock and key combination includes the requested corresponding sets of parameters.

19. The system of claim 13, wherein the server system is further operable to periodically determine whether one or more of the corresponding sets of parameters change; and change the generated matching lock and key combination based on a determination that one or more of the corresponding sets of parameters changed.

20. The system of claim 13, wherein the key of the generated matching lock and key combination includes at least an encrypted portion of the lock.

21. The system of claim 13, wherein the server system is further operable to: generate the unique session ID associated with the received authorization request, wherein the matching lock and key combination is generated based further on the generated unique session ID.

22. A machine-implemented method of validating an authorization request for executing a command, the method comprising:

receiving, at a server system, the authorization request from a first entity for authorizing a second entity to execute the command initiated by the first entity, wherein the first entity and the second entity are different computing devices, wherein the received authorization request specifies a third entity;

generating, by the server system, an access control session, wherein, based on the authorization request, the server system associates each of the first entity, the second entity and the third entity with one another during the access control session;

requesting, by the server system, a corresponding set of parameters from each of the first, second, and third entities, wherein the requested corresponding sets of parameters are required for validating the received authorization request;

receiving, at the server system, the requested corresponding sets of parameters from the first, second, and third entities;

generating, by the server system, a matching lock and key combination for the access control session based on the received corresponding sets of parameters, wherein the generated matching lock and key combination is associated with and identified by a generated unique session ID wherein the generated matching lock and key combination includes a lock and a key that match each other;

sending, by the server system, the key of the generated matching lock and key combination of the access control session to each of the first entity and the second entity;

receiving, at the server system, the key from the third entity, wherein the key is sent from the third entity in response to the service provider receiving a request from the second entity;

determining, by the server system, that the second entity and the third entity are included in the access control session based on whether the received key matches the lock of the generated matching lock and key combination of the access control session; and in response to a determination that the second entity and the third entity are included in the access control session, authorizing the second entity and the third entity to execute the command initiated by the first entity.

23. The method of claim 1, wherein the second entity is authorized further based on determining that the received corresponding sets of parameters is satisfied.

24. The method of claim 23, wherein the each corresponding set of parameters includes a corresponding set of rules associated with one of the first entity, the second entity, and the service provider.

* * * * *